US007933844B2

(12) United States Patent
Rundle

(10) Patent No.: US 7,933,844 B2
(45) Date of Patent: Apr. 26, 2011

(54) ADDRESS FORWARDING FOR PARCELS

(75) Inventor: Alfred T. Rundle, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 304 days.

(21) Appl. No.: 11/680,293

(22) Filed: Feb. 28, 2007

(65) Prior Publication Data
US 2008/0208772 A1    Aug. 28, 2008

(51) Int. Cl.
*G06Q 30/00* (2006.01)
(52) U.S. Cl. .................. 705/330; 705/402; 705/410
(58) Field of Classification Search .................. None
See application file for complete search history.

(56) References Cited

U.S. PATENT DOCUMENTS

| | | | |
|---|---|---|---|
| 5,422,821 A | 6/1995 | Allen et al. | |
| 5,703,783 A | 12/1997 | Allen et al. | |
| 5,734,568 A | 3/1998 | Borgendale et al. | |
| 6,259,964 B1 * | 7/2001 | Robinson | 700/224 |
| 6,292,709 B1 * | 9/2001 | Uhl et al. | 700/226 |
| 6,549,892 B1 | 4/2003 | Sansone | |
| 6,647,385 B2 | 11/2003 | Seestrom et al. | |
| 6,783,063 B2 * | 8/2004 | Holden | 235/379 |
| 6,993,491 B2 | 1/2006 | Sansone | |
| 2001/0010334 A1 | 8/2001 | Park et al. | |
| 2004/0032986 A1 | 2/2004 | Snapp | |
| 2004/0065598 A1 | 4/2004 | Ross et al. | |
| 2004/0094615 A1 | 5/2004 | Sansone et al. | |
| 2004/0117328 A1 * | 6/2004 | Andrew | 705/410 |
| 2004/0220888 A1 * | 11/2004 | O'Martin et al. | 705/401 |
| 2004/0222889 A1 | 11/2004 | Hoshina et al. | |
| 2005/0137990 A1 * | 6/2005 | Mayer et al. | 705/410 |
| 2005/0137991 A1 | 6/2005 | Bruce et al. | |
| 2005/0251285 A1 | 11/2005 | Boyce et al. | |
| 2005/0259658 A1 * | 11/2005 | Logan et al. | 370/392 |
| 2006/0102531 A1 | 5/2006 | Conard et al. | |

(Continued)

OTHER PUBLICATIONS

"Pitney Bowes Introduces Internet Solution for Address Updates; ForwardTrak Net gives mailers an easy way to locate customers who have moved." Business Wire, Tuesday, Nov. 28, 2000.*

(Continued)

*Primary Examiner* — Rutao Wu
(74) *Attorney, Agent, or Firm* — Miles & Stockbridge PC; James T. Carmichael; Stephen W. Aycock, II

(57) ABSTRACT

A method for sorting parcels may include reading, during a first sortation pass, machine readable indicia applied to the parcel prior to mailing and at least a portion of delivery address information on a parcel. The method may also include selecting a reference indicium from the machine readable indicia and creating an entry, corresponding to the reference indicia, in a first database, the entry including a portion of the delivery address information for the parcel and a value corresponding to the reference indicium. The method may also include determining whether the delivery address information has a corresponding forwarding order, and, if a corresponding forwarding order exists, modifying the delivery address information in accordance with the forwarding order. The method may include forwarding the entry to a second database different from the first database, the second database corresponding to the delivery address information. The method may include reading the machine readable indicia during a second sortation pass, subsequent to the first, identifying the reference indicium and retrieving the entry corresponding to the reference indicium from the second database, and sorting the parcel according to the portion of the delivery address information in the entry retrieved from the database. The method may also include delivering the parcel to a location corresponding to the delivery address information retrieved from the database, even if the delivery address information differs from the destination address originally applied to the parcel.

21 Claims, 7 Drawing Sheets

U.S. PATENT DOCUMENTS

2006/0184269 A1 8/2006 Wilson et al.
2007/0011245 A1* 1/2007 Kawashima et al. ......... 709/206
2007/0192191 A1* 8/2007 Neal et al. ...................... 705/14
2008/0130947 A1* 6/2008 Ross et al. .................... 382/101

OTHER PUBLICATIONS

"Docucorp Expands ASP Services; Mail Forwarding Technology Provides Financial Savings." Business Wire, Thursday, Jan. 9, 2003.*

* cited by examiner

ADDRESS FORWARDING FOR PARCELS

The present invention relates generally to sorting and, more particularly, to computerized sorting and forwarding for parcels.

Mail forwarding systems have been developed that automatically detect and re-route mail pieces that are undeliverable as addressed due to a forwarding request by a mail recipient, such as a change of address. Conventional mail forwarding systems may involve applying an identification tag to a mail piece to uniquely identify the mail piece during sorting and delivery and also printing and applying a label with corrected address text. The label with corrected text may be used to indicate to a mail carrier or parcel delivery person the "new" address that the mail piece is to be delivered to according to the forwarding request.

The identification tag may allow optical character recognition (OCR) results and video coding system (VCS) results, for example a destination ZIP code determination, to be associated with the mail piece and stored in a database. The identification tag may be a barcode, or other machine readable indicia, that is applied directly to the mail piece, or applied to an adhesive backed label that is then affixed to the mailpiece. Once the mail piece has an identification tag applied, the need to repeat the OCR or VCS process during a subsequent sortation may be reduced because the identification tag may be read and the previously stored OCR or VCS results may be retrieved from the database. While the practice of applying identification tags and corrected address labels to flat mail pieces may be relatively easy due to the typically predictable and somewhat limited range of dimensions of flat mail pieces, applying identification tags and corrected address labels to parcels may present a difficulty due to variation in size or shape of parcels being mailed.

The present invention was conceived in light of the above-mentioned difficulty with parcel identification tagging and corrected address label application, and in light of a desire to achieve a sorting efficiency similar to that achieved using identification tags and corrected address labels, while reducing the expense and operational requirements that may accompany identification tagging and corrected address labeling systems.

An exemplary embodiment of the present invention relates to a method for sorting and delivering forwarded parcels may include reading, during a first sortation pass, machine readable indicia applied to the parcel prior to mailing and at least a portion of delivery address information on a parcel. The method may also include selecting a reference indicium from the machine readable indicia and creating an entry, corresponding to the reference indicia, in a first database, the entry including a portion of the delivery address information for the parcel and a value corresponding to the reference indicium. The method may include determining whether the delivery address information has a corresponding forwarding order, and, if a corresponding forwarding order exists, modifying the delivery address information in accordance with the forwarding order. The method may include forwarding the entry to a second database different from the first database, the second database corresponding to the delivery address information. The method may include reading the machine readable indicia during a second sortation pass, subsequent to the first, identifying the reference indicium and retrieving the entry corresponding to the reference indicium from the second database, and sorting the parcel according to the portion of the delivery address information in the entry retrieved from the database. The method may include delivering the parcel to a location corresponding to the delivery address information retrieved from the database.

Another exemplary embodiment of the present invention relates to a computer system for sorting parcels, the computer system including a processor, and a memory including software instructions that, when executed, cause the computer system to perform a series of steps. The steps may include reading, during a first sortation pass, at least one machine readable indicia and delivery address information on a parcel, the at least one machine readable indicia having been applied to the parcel prior to mailing, and selecting a reference indicium from the at least one machine readable indicia. The steps may also include creating an entry, corresponding to the reference indicia, in a database, the entry including a portion of the delivery address information for the parcel and a value corresponding to the reference indicium. The steps may include determining whether the delivery address information has a corresponding forwarding order, and, if a corresponding forwarding order exists, modifying the delivery address information in accordance with the forwarding order. The steps may include reading the at least one machine readable indicia during a second sortation pass, subsequent to the first, identifying the reference indicium and retrieving the entry corresponding to the reference indicium from the database, and sorting the parcel according to the portion of the delivery address information in the entry retrieved from the database. The steps may include delivering the parcel to a location corresponding to the delivery address information retrieved from the second database.

Another exemplary embodiment of the present invention relates to a computer program product for sorting parcels. The computer program product may include software instructions for enabling a computer to perform predetermined operations, and a computer readable medium bearing the software instructions. The predetermined operations may include reading, during a first sortation pass, machine readable indicia and delivery address information on a parcel, the machine readable indicia having been applied to the parcel prior to mailing, and selecting a reference indicium from the machine readable indicia. The operations may also include creating an entry, corresponding to the reference indicia, in a database, the entry including a portion of the delivery address information for the parcel and a value corresponding to the reference indicium. The operations may include determining whether the delivery address information has a corresponding forwarding order, and, if a corresponding forwarding order exists, modifying the delivery address information in accordance with the forwarding order. The operations may also include reading the machine readable indicia during a second sortation pass, subsequent to the first, identifying the reference indicium and retrieving the entry corresponding to the reference indicium from the database, and sorting the parcel according to the portion of the delivery address information in the entry retrieved from the database.

DETAILED DESCRIPTION

In general, a mail forwarding process may be described in terms of "outward" and "inward" sorting and delivery of a parcel. The first phase of processing a parcels stream may include outward sorting. Outward sorting may include determining a destination address for each parcel and sorting each parcel to a destination bin associated with an "inward" sorting center corresponding which may have responsibility for deliveries to the destination address. The bin may be transported to the inward sorting center. The inward sorting process may include sorting an incoming parcel stream to a specific carrier route for delivery.

Figure 1:
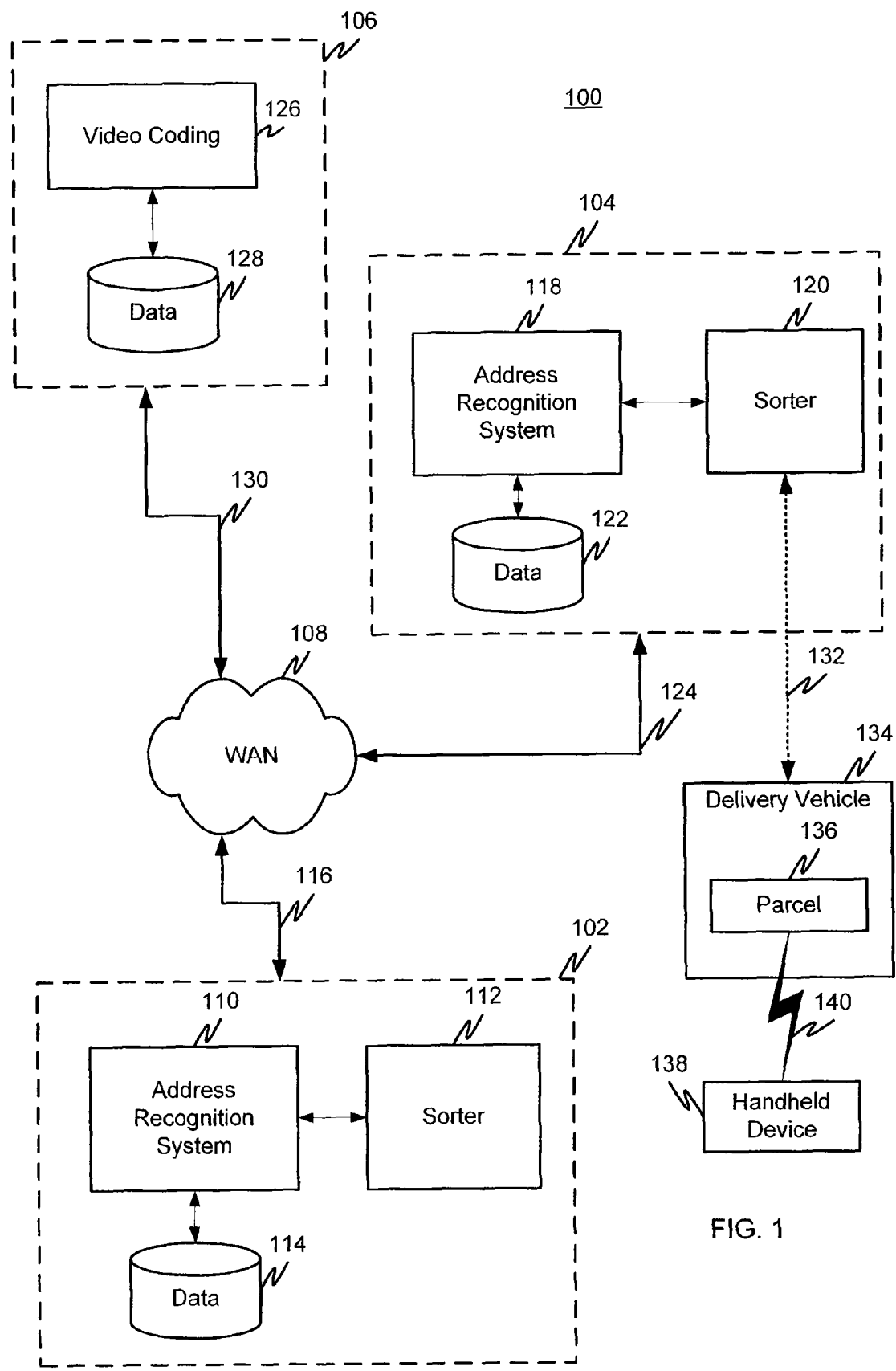
FIG. 1 provides a block diagram illustration of an exemplary mail sorting system in accordance with the present invention.

FIG. 1 provides a block diagram illustration of an exemplary mail sorting system. In particular, a mail sorting system 100 includes a first mail sorting station 102, a second mail sorting station 104, and a video coding system 106, each of which is connected to a wide area network (WAN) 108. The first mail sorting station 102 includes an address recognition system 110, a sorter 112, a database 114, and a first link 116. The second mail sorting station 104 includes an address recognition system 118, a sorter 120, a database 122, and a second link 124. The video coding system 106 includes one or more video coding stations 126, a database 128, and a third link 130. A mail delivery vehicle 134 may be used to deliver a parcel 136 on the delivery vehicle. A handheld device 138 may be used in conjunction with the mail sorting system in order to deliver sorted mail pieces. The handheld device 138 may be used to receive a signal 140 that represents a machine readable indicia on the parcel 136. The handheld device may also be in communication with a sorting station (102 or 104) through a wired or wireless link.

The first mail sorting station may be coupled to the WAN 108 via the first link 116. In operation, parcels may be placed on the sorter 112. The address recognition system 110 may take an image of the parcel and process the image using OCR techniques in order to obtain destination address information, including a recipient name. If the address recognition system 110 is able to automatically determine destination address information for the parcel, then the sorter 112 may be directed to sort the parcel according to the destination address information. For example, the address recognition system may be able to determine a destination address having an active forwarding request. The forwarding request may list a "new" address to which the parcel should be forwarded. The forwarding address may then be stored in database 114 as the destination address and the database record may be forwarded to a database at a destination sorting station. For example, the sorter 112 may sort the parcel into a bin for delivery to the second mail sorting station 104 and the first sorting station 102 may forward the stored destination address information from database 114 to the second sorting station 106 for storage in its database 122. The parcel in need of forwarding may be sorted to a destination bin based on the forwarding address without a need to divert the forwarded parcel to a separate bin for processing of forwarded parcels. In other words, using an embodiment of the present invention, the forwarded parcel may be sorted to a destination bin containing non-forwarded parcels or mail pieces. Thus, a need for a separate, additional sorting process due to forwarding may be reduced. If the address recognition system 110 is unable to automatically obtain destination address information, the image of the parcel may be transmitted to the video coding system 106 via the WAN 108.

At the video coding system 106, the image of the parcel may be sent to one or more video coding stations 126 for video coding by one or more operators. Once the video coding process is complete, the results as may be stored in the video coding database 128, including destination address information may be returned to the first mail sorting station 102, stored in the database 114, and the sorter 112 may be directed to sort the parcel according to the destination address information and the first mail sorting station 102 may forward the stored destination address information to a destination mail sorting station. It should be appreciated that the destination address on the parcel may be determined automatically through OCR, manually through video coding, or through a combination of the above.

Having either automatically determined destination address information through OCR or having manually determined it through video coding, it is desirable to retain and store the destination address information for use in the future, for example, when the parcel reaches the second mail sorting station 104. In order to associate the stored address information with the parcel a method of identifying the parcel may be useful.

An exemplary embodiment of the present invention may provide a method and system for sorting and forwarding parcels with implicit identification. The term "implicit identification" as used herein refers generally to any computer readable element already present on or in a parcel prior to mailing or sorting. In other words, embodiments of the present invention may identify a parcel and track it through various sorting processes and deliver it to a forwarding address by adopting machine readable indicia or elements already placed on or in the parcel for other purposes and using one or more of the indicia or elements as an identification tag for sorting purposes. Thus, a need to affix or apply an additional machine readable identification label or tag, or a corrected address label after the parcel has been received for sorting may be reduced.

At the second mail sorting station 104, the parcel may be received and placed on the sorter 120. The address recognition system 118 may take an image of the parcel. If the address recognition system 118 is able to identify the parcel using the machine readable indicia, then it may access the database 122 in order to retrieve any available stored destination address information for the parcel, thus possibly reducing the need for an additional OCR or video coding step.

Using the retrieved destination address information, the parcel may be sorted to a delivery route and/or sequence. A delivery vehicle 134 may correspond to the delivery route or sequence. The parcel 136 may be placed on the delivery vehicle 134 for delivery to a recipient. During the delivery process, a deliver person may scan the parcel 136 with the handheld device 138 and receive a signal 140 from the parcel 136.

The handheld device may be a handheld computer, personal digital assistant, wireless phone, specialized parcel delivery computer, or other handheld device suitable for use in delivering mail. Also, the handheld device 138 may be a handheld barcode scanner, or other machine readable element sensing device, that may be coupled to a processor or computer onboard the delivery vehicle or carried by the delivery person. The signal 140 may include a reflected signal such as light reflecting from a barcode pattern, a radio frequency signal emanating from a radio frequency identification tag, or other passively or actively generated signal capable of being sensed by a machine.

The handheld device may contain stored copies of parcel database records that correspond to the parcels onboard the delivery vehicle or the handheld device may be in communication with an external computer and database, such as those at a mail sorting station. Once the parcel 136 has been scanned by the handheld device 138, the machine readable indicia on the parcel may be read and the parcel database record may be retrieved. The forwarding address stored in the database record may be displayed on the handheld device so that the delivery person may deliver the parcel to the forwarding address instead of the "old" destination address that had been applied to the parcel. Thus, the parcel may be delivered to the forwarding address without a need for the forwarding address to have been applied to the parcel. An exemplary embodiment of the method of sorting and forwarding parcels in accordance with the present invention is described below.

Figure 2:
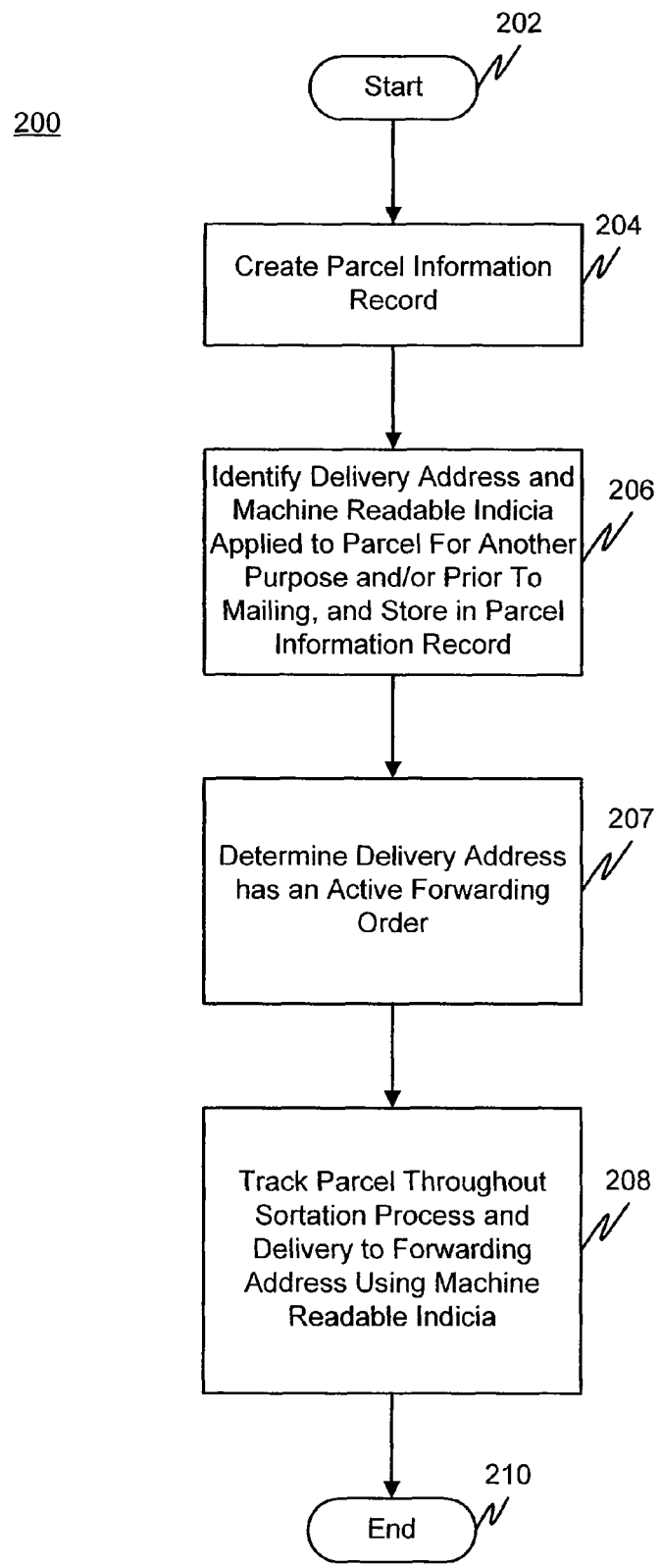
FIG. 2 provides a flowchart illustrating an exemplary embodiment of a method of sorting parcels with implicit identification in accordance with the present invention.

FIG. 2 provides a flowchart 200 illustrating an exemplary embodiment of a method for sorting parcels with implicit identification in accordance with the present invention. In particular, the method begins at step 202 and continues to step 204.

In step 204, a new parcel information record is created for a new parcel being sorted. The parcel information record may include, for example, a field for an identification value, destination address fields, return address fields, postage fields, physical dimension fields, and the like. The parcel information record may be empty initially, pending the reading of information from the parcel. Once the new parcel information record has been created control continues to step 206.

In step 206, delivery address information, which may include a recipient name, and machine readable indicia information are identified on the parcel and read by the address recognition system. A portion of the delivery address information and the machine readable indicia information are stored in the parcel information record created in step 204. Control continues to step 207.

In step 207, a determination is made as to whether the destination address on the parcel has an active forwarding order, for example a change of address. This may be determined by comparing the destination address information to a change of address database that may contain records of forwarding order requests. If a forwarding order is active for the address and recipient, then the destination address stored in the parcel information record may be altered in accordance with the forwarding type and forwarding address. Control continues to step 208.

In step 208, the parcel is tracked throughout sortation and delivery using the machine readable indicia and the corresponding destination address stored in the parcel information record. This may include reading the machine readable indicia at each sortation and looking up a value corresponding to the machine readable indicia in a database containing parcel information records and retrieving the parcel information record associated with the parcel being sorted. The method continues to step 210, where the method ends. It should be appreciated that steps 204-208 may be repeated in order to sort an incoming stream of parcels. Further, steps 204-208 may be performed on the same or different equipment in the same or different facilities.

Figure 3:
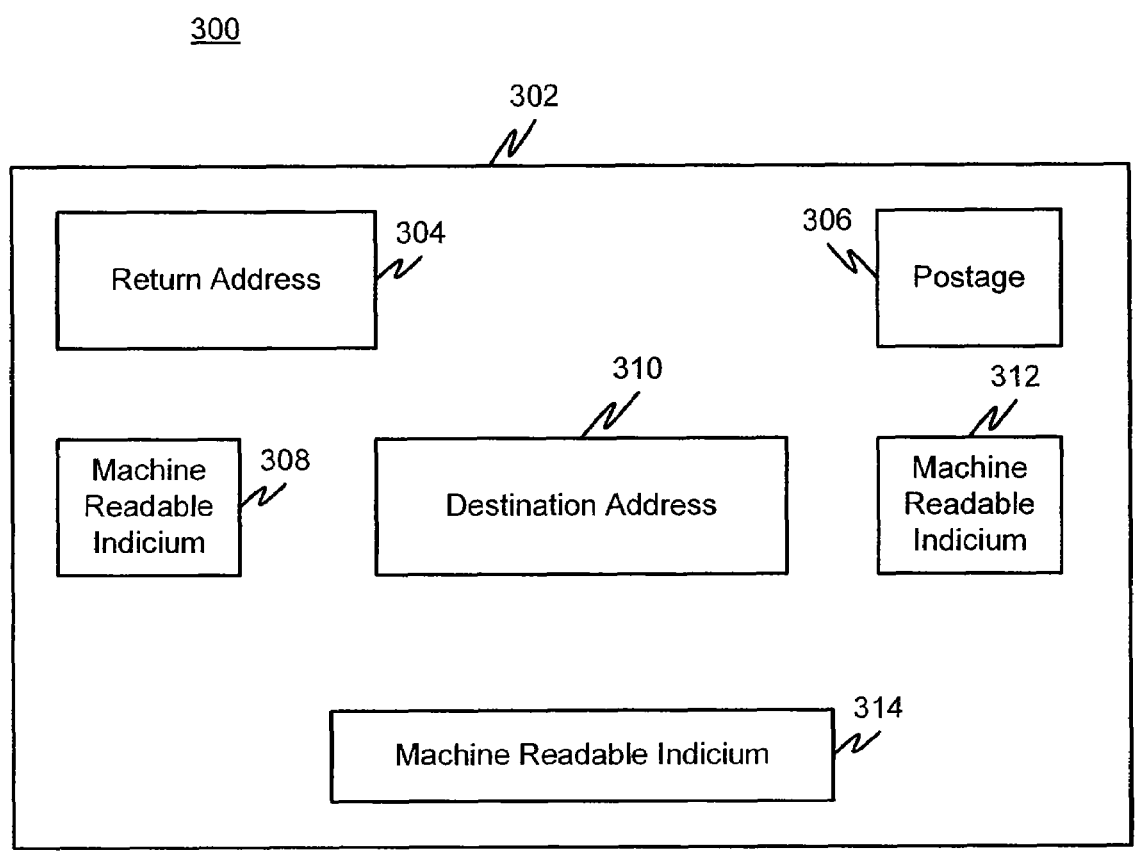
FIG. 3 provides a diagrammatic illustration of an exemplary image of a parcel surface.

FIG. 3 provides a diagrammatic illustration of an exemplary image of a parcel surface. In particular, an exemplary parcel image 300 includes a parcel surface 302, a return address block 304, a postage block 306, a first machine readable indicium 308, a destination address block 310, a second machine readable indicium 312, and a third machine readable indicium 314.

In a sorting operation, an address recognition system may take an image of the mail piece as represented in FIG. 3. The address recognition system may attempt to recognize the handwritten or machine printed return address 304 and destination address 310. The address recognition system may also attempt to validate the postage 306. The destination address applied to the mail piece may be an "old" address that has been changed to a "new" address via a forwarding order or request. The system and method of the present invention may be used with various types of mail pieces, which may include letters, flats, parcels, and the like.

Various machine readable indicia may be applied to a parcel prior to mailing. These machine readable indicia may be applied for a purpose other than tracking the parcel, or mail item, during sortation. Further, information related to these machine readable indicia applied for other purposes may be recorded in a different database from a database used for parcel, or mail, sorting. The different database may not be accessible by systems used to sort parcels or other mail pieces. Also, the other purpose may be defined by software different from software used for parcel or mail sorting. The address recognition system may attempt to read and interpret any machine readable indicia (such as 308, 312, and 314) that may be present on the parcel. These indicia may include, for example, a USPS delivery confirmation barcode, a US or international customs barcode, a USPS POSTNET barcode, a USPS PLANET barcode, USPS 4-state barcode, postage barcode, shipper barcode, or the like. These barcodes may be printed on a label that is then affixed to the parcel, may be printed directly on the parcel, or may be applied in any suitable manner for such indicia.

Some barcodes may be of a standard format such that the address recognition system can identify them as unique codes. For example, delivery confirmation and customs barcodes are typically unique identifiers. Other barcodes may not be unique, such as POSTNET, PLANET, or shipper barcodes.

In the case where one or more unique barcodes are present on the parcel, the methods and systems of the present invention may use that barcode value as a unique parcel identifier for future sorting. In the case where no single barcode, or other machine readable element, represent a unique value in the database, embodiments of the method and system of the present invention may use a combination of two or more non-unique values to obtain a unique value for identifying the parcel. For example, machine readable indicia 312 and 314 may not, in themselves, be unique, but a combination of the two may yield a unique identifier for use in the database.

Also, a non-unique value associated with machine readable indicia may be used. If a non-unique value is used, then additional steps may be performed at a subsequent sorting in order to resolve any ambiguity. Various embodiments of the method and system of the present invention in relation to different sorting stages are described below.

Figure 4:
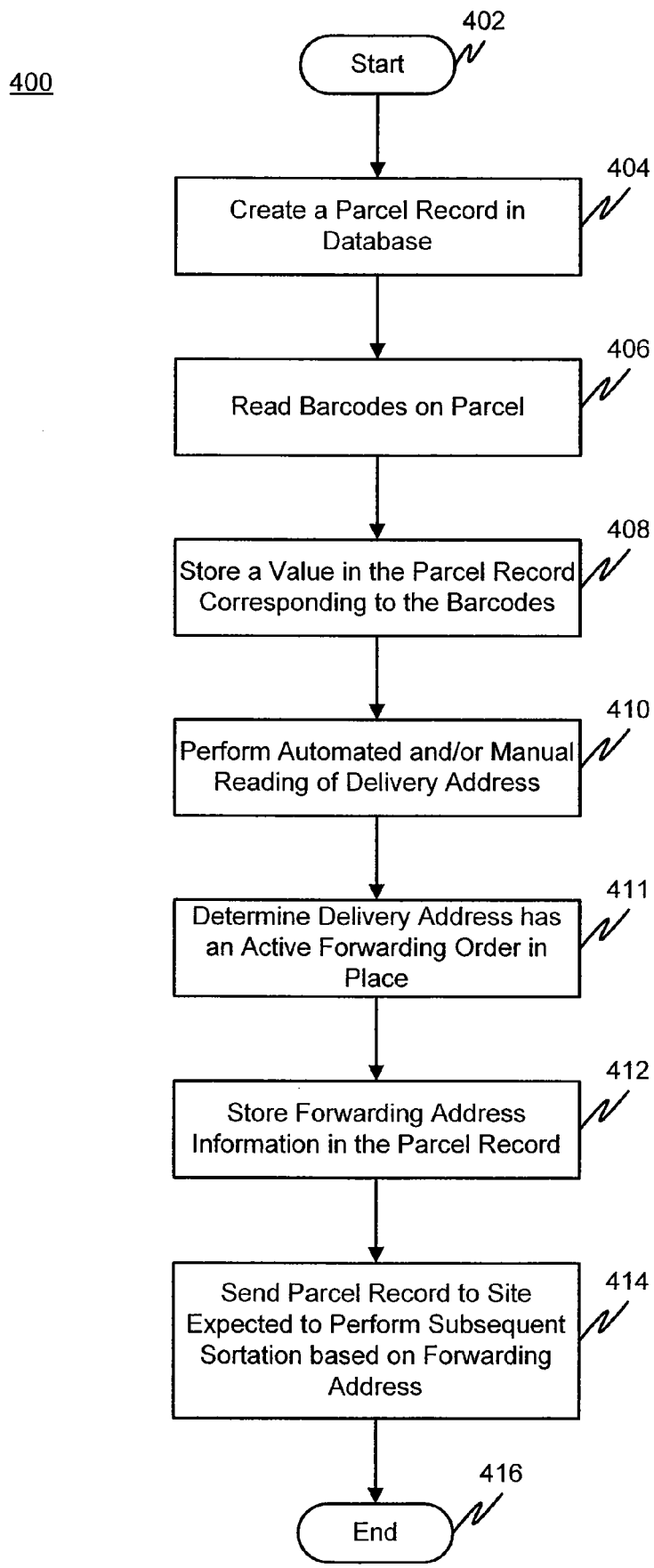
FIG. 4 provides a flowchart illustrating an exemplary embodiment of a method of sorting parcels during a first sortation pass with implicit identification in accordance with the present invention.

FIG. 4 provides a flowchart 400 illustrating an exemplary embodiment of a method of sorting parcels during a first sortation pass with implicit identification in accordance with the present invention. The method begins at step 402 and continues to step 404.

In step 404, a parcel record is created in a database. This parcel record may represent an incoming parcel ready for sortation. The parcel record may include destination address fields, parcel identification fields, and other fields related to sorting or delivering the parcel. The method continues to step 406.

In step 406, barcodes, or other machine readable elements, present on the parcel prior to mailing are read. The system may then attempt to identify a unique value from among the various barcodes read to be used as a reference indicium for the parcel. As mentioned above, some barcodes are standard and known to be unique, while others may be non-unique. The system may then arrive at a unique or non-unique value, corresponding to the reference indicium, for identifying the parcel. The method continues to step 408, where the value corresponding to one or more of the barcodes is stored in the parcel record for use in later identifying the parcel. The method continues to step 410.

In step 410, delivery, or destination, address information is read, either manually or automatically, from the parcel image. It should be appreciated that other information about the parcel may be read and that the order of reading addresses, machine readable indicia, or other information from the parcel image may be varied. The method continues to step 411.

In step 411, a determination is made as to whether the destination address on the parcel has an active forwarding order, for example a change of address. This may be determined by comparing the destination address information to a change of address database that may contain records of forwarding order requests. If a forwarding order is active for the address and/or recipient, then the destination address stored in the parcel information record may be altered in accordance with the forwarding type and forwarding address. After obtaining some or all of the destination address information, which may include the recipient's name, the method continues to step 412 where at least a portion of the destination address information, which may now be a forwarding address, is stored in the parcel record. The method continues to step 414.

In step 414, the parcel record is sent to a site, based on the forwarding address, expected to perform a subsequent sorting on the parcel. Also, the parcel may be sorted into a bin or the like for shipment to the site expected to perform a subsequent sorting on the parcel. It should be appreciated that the site performing the subsequent sorting may be the same site as performs the first sorting pass on the parcel. Thus, both the parcel and the parcel record may remain in the same location for a subsequent sorting pass, or one or both may be sent to a different location for use in a subsequent sorting pass. The method continues to step 416, where the method ends. It should be appreciated that steps 402-416 may be repeated, fully or in part, as necessary or desired to accomplish a contemplated forwarded parcel sorting and delivery task.

Figure 5:
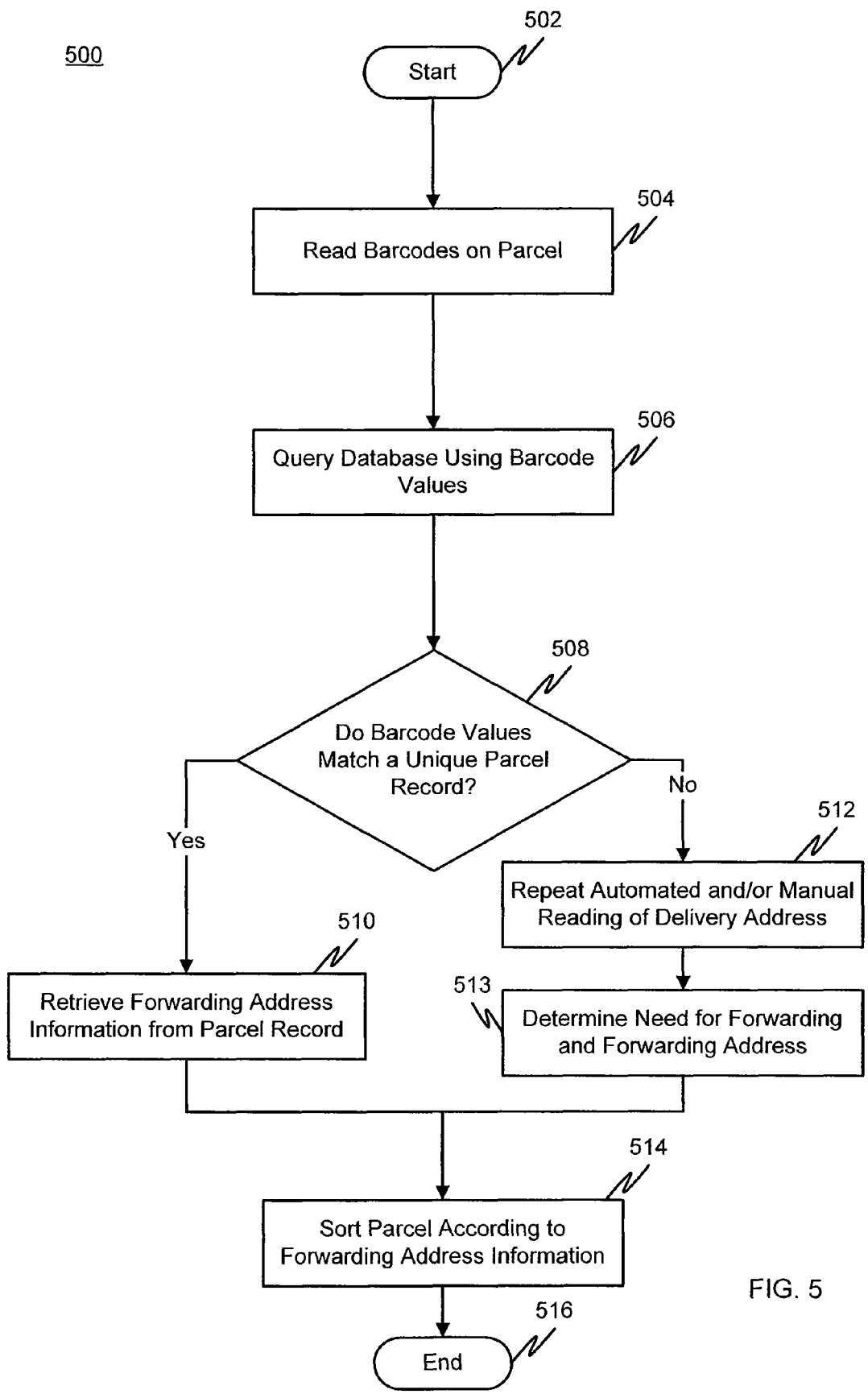
FIG. 5 provides a flowchart illustrating an exemplary embodiment of a method of sorting parcels during a subsequent sortation pass with implicit identification in accordance with the present invention.

FIG. 5 provides a flowchart illustrating an exemplary embodiment of operating a sorting system according to a method of sorting parcels during a subsequent sortation pass with implicit identification for in accordance with the present invention. In particular, the method begins at step 502 and continues to step 504.

In step 504, some or all of the barcodes, or other machine readable elements, present on the parcel prior to mailing are read. The method continues to step 506.

In step 506, a database is queried using some or all of the barcode value read in step 504. The method continues to step 508, where results of the database query are evaluated. In step 508, if a barcode value matches a unique database parcel record, then the method continues to step 510. If none of the barcode values, or combinations of values, matches a unique database entry, then the method continues to step 512.

In step 510, the parcel record matching the barcode value is retrieved along with the delivery, or destination, address information which may include forwarding address information. The method continues to step 514.

In step 512, a repeat of an automated (e.g., OCR) or manual (e.g., video coding) process may be performed in order to obtain the delivery, or destination, address information. The method continues to step 513.

In step 513, a determination is made as to whether the destination address on the parcel has an active forwarding order, for example a change of address. This may be determined by comparing the destination address information to a change of address database that may contain records of forwarding order requests. If a forwarding order is active for the address and recipient, then the destination address stored in the parcel information record may be altered in accordance with the forwarding type and forwarding address. The method then continues to step 514.

In step 514, the destination address information including any forwarding address information obtained in steps 510 or 512 is used to sort the parcel. The method continues to step 516, where the method ends. It should be appreciate that steps 502-516 may be repeated, fully or in part, as necessary or desired in order to accomplish a contemplated sorting operation.

Figure 6:
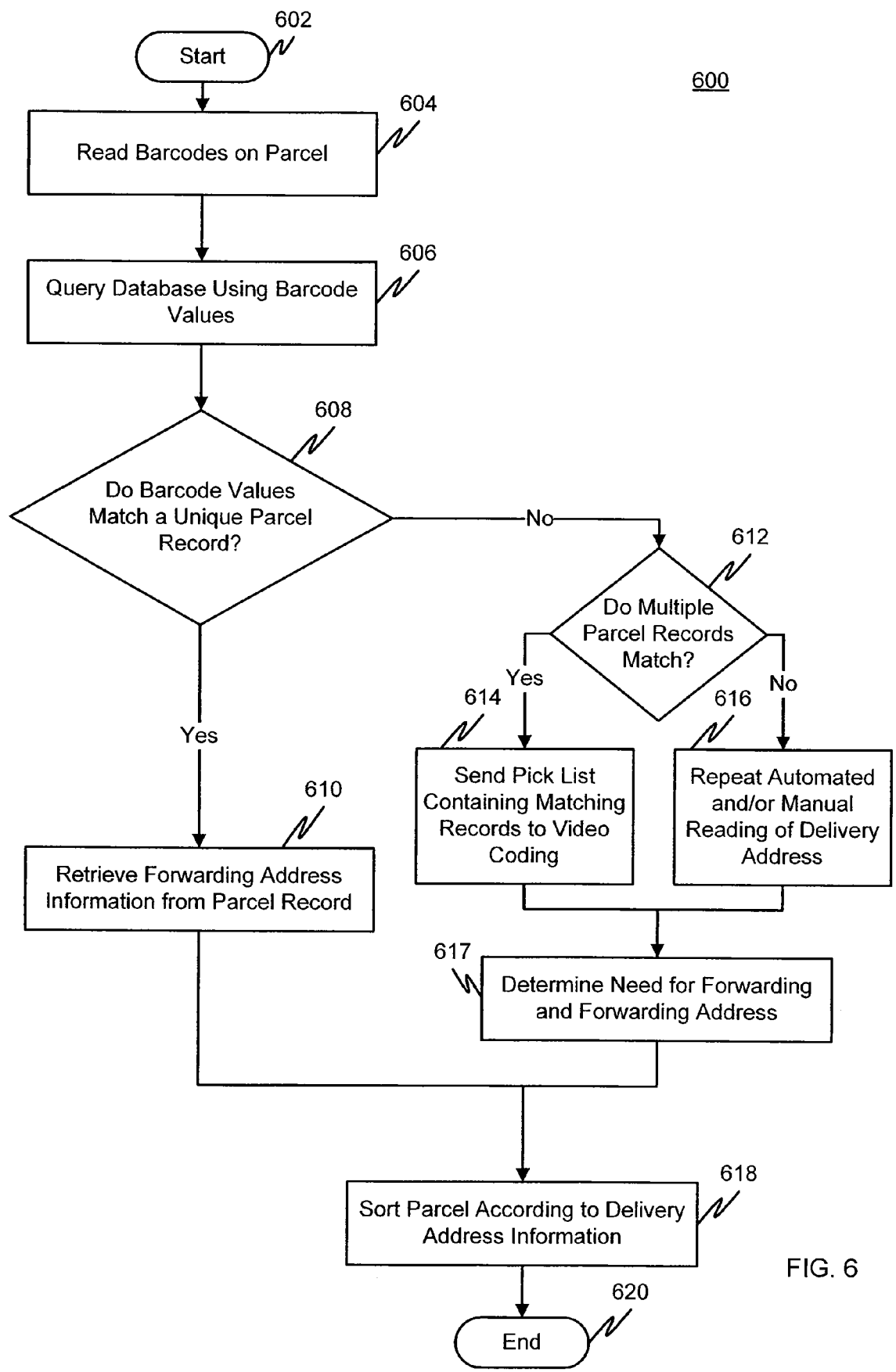
FIG. 6 provides a flowchart illustrating an exemplary embodiment of a method of sorting parcels during a subsequent sortation pass with implicit identification in accordance with the present invention.

FIG. 6 provides a flowchart 600 illustrating an exemplary embodiment of operating a parcel sorting system according to a method of sorting parcels during a subsequent sortation pass with implicit identification in accordance with the present invention. In particular, the method begins at step 602 and continues to step 604.

In step 604, some or all of the barcodes, or other machine readable elements, present on the parcel prior to mailing are read. The method continues to step 606.

In step 606, a database is queried using some or all of the barcode value read in step 604. The method continues to step 608, where results of the database query are evaluated. In step 608, if a barcode value matches a unique database parcel record, then the method continues to step 610. If none of the barcode values, or combinations of barcode values, matches a unique database entry, then the method continues to step 612.

In step 610, the parcel record matching the barcode value is retrieved along with the delivery, or destination, address information, which may include forwarding address information. The method continues to step 618.

In step 612, results of the database query are evaluated further. If database query returned multiple parcel records matching barcode values from the parcel, the method continues to step 614. If the database query returned no parcel records then the method continues to step 616.

In step 614, a "pick list" containing the multiple matching records may be sent to video coding for a manually selection of the correct parcel record. The method continues to step 618.

In step 616, a repeat of an automated (e.g., OCR) or manual (e.g., video coding) process may be performed in order to obtain the delivery, or destination, address information. The method then continues to step 617.

In step 617, a determination is made as to whether the destination address on the parcel has an active forwarding order, for example a change of address. This may be determined by comparing the destination address information to a change of address database that may contain records of forwarding order requests. If a forwarding order is active for the address and recipient, then the destination address stored in the parcel information record may be altered in accordance with the forwarding type and forwarding address. The method then continues to step 618.

In step 618, using the delivery or destination address information, which may include forwarding address information, obtained in steps 610, 614, or 616, the parcel is sorted. The method continues to step 620, where the method ends. It should be appreciate that steps 602-620 may be repeated, fully or in part, as necessary or desired in order to accomplish a contemplated forwarded parcel sorting and delivery operation.

Figure 7:
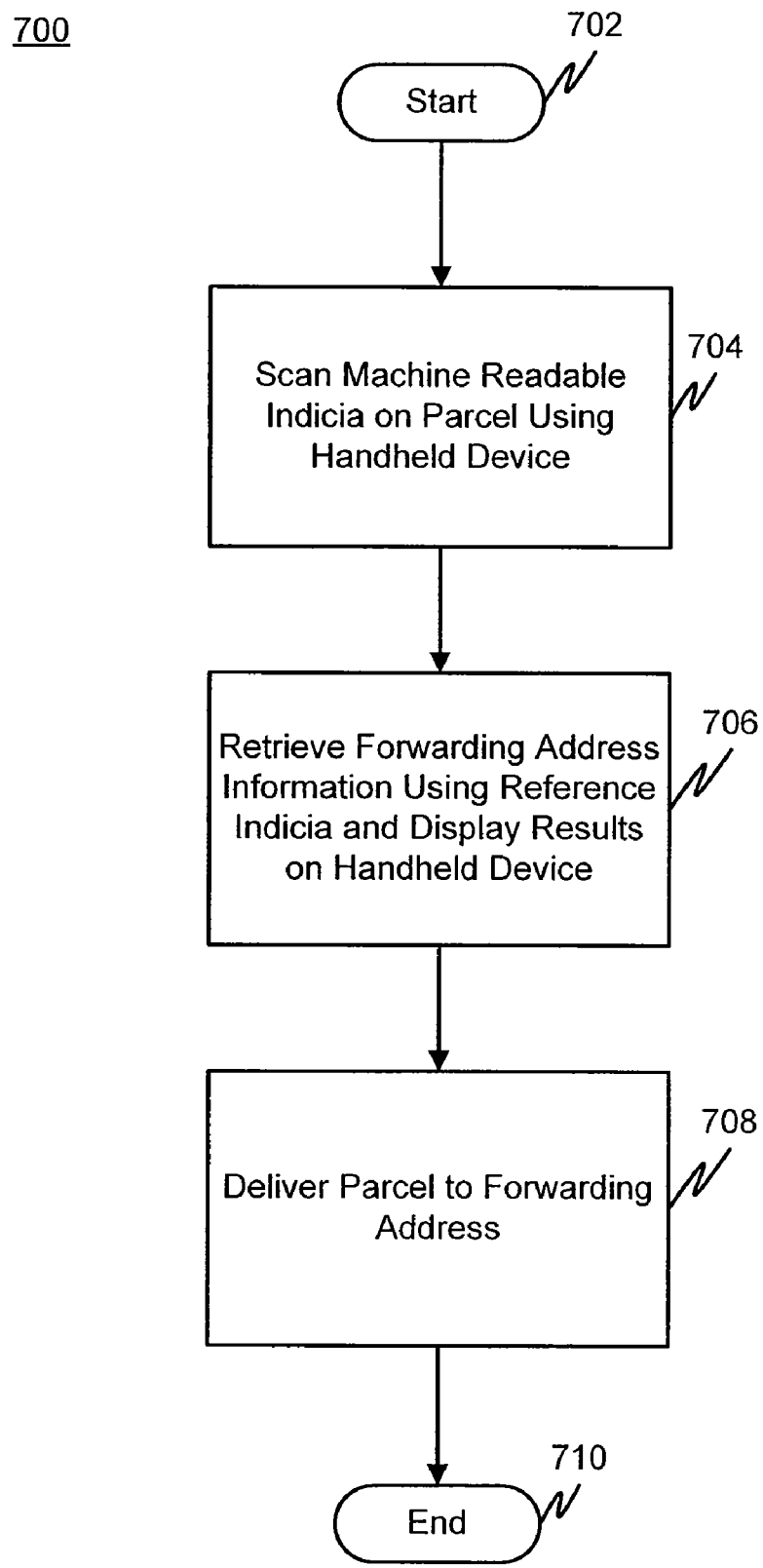
FIG. 7 provides a flowchart illustrating an exemplary forwarded parcel delivery method in accordance with the present invention.

FIG. 7 provides a flowchart illustrating an exemplary forwarded parcel delivery method in accordance with the present invention. In particular, the method 700 begins at step 702 and continues to step 704.

In step 704, machine readable indicia on a parcel are scanned or read using a handheld device. The handheld device may include a handheld computer, personal digital assistant, specialized shipping computer, or other device suitable for use in mail delivery. The handheld device may include a machine readable sensing element such as a barcode reader, an image sensor, an RFID tag reader, or other sensing module corresponding to the type of machine readable element being used. The method continues to step 706.

In step 706, a value corresponding to the machine readable element read in step 704 is used to retrieve delivery information, including a forwarding address. The delivery information may then be displayed on a display of the handheld device in order for a delivery person to view the forwarding address. The delivery person may typically scan parcel for other purposes such as delivery confirmation, during such a scan, the system and method of the present invention may be used to also retrieve and display the "new" or forwarding address for the parcel. The parcel delivery information may be retrieved locally from the handheld device memory or storage, or obtained remotely from another database, for example from a sorting station database via a wireless link.

If the retrieval of the parcel information records returns multiple parcel information records, details of the records may be displayed in order to assist the delivery person in selecting the correct parcel information record. For example, the recipient name field may be used to select the correct parcel information record. Because a recipient name is typically required for forwarding orders, it would also typically be available for use in parcel information records. The method continues to step 708.

In step 708, the parcel is delivered to the forwarding address displayed on the handheld device display. This delivery may take place without the forwarding address ever being printed in the parcel. The method continues to step 710, where the method ends. It should be appreciated that steps 702-710 may be repeated in whole or in part as needed or desired to achieve a contemplated parcel delivery task.

It should also be appreciated that the above exemplary embodiments include only two sorting passes for simplicity of illustration. More or less sorting passes may be used in a contemplated sorting operation. Also, some details associated with sorting equipment and procedure not directly related to describing the present invention may have been simplified or not discussed in order to provide a more clear description of embodiments of the present invention. Such omitted details and procedures would typically be well known to those of skill in the art.

While exemplary embodiments of the method, system, and computer program product for parcel forwarding with implicit identification of the present invention have been described above in relation to barcodes for illustration purposes, it should be appreciated that machine readable indicia may include other machine readable elements, such as, for example, radio frequency identification tags (RFID), image based tags, chemical based tags, biological tags, or other identification or encoding elements that are presently, or in the future may become, machine readable. In general, any machine readable identification element affixed to, within, or applied to a parcel may be used in connection with the method, system, and computer program product for implicit parcel forwarding according to the present invention.

The method, system, and computer program product for parcel forwarding, exemplary embodiments of which are described above and shown in the figures, may be implemented on a general-purpose computer, a special-purpose computer, a programmed microprocessor or microcontroller and peripheral integrated circuit element, and ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein may be used to implement the method, system, or computer program product for parcel forwarding according to this invention.

Furthermore, the disclosed method, system, and computer program product for parcel forwarding may be readily implemented, fully or partially, in software using, for example, object or object-oriented software development environments that provide portable source code that can be used on a variety of computer platforms. Alternatively, the disclosed method, system, and computer program product for parcel forwarding may be implemented partially or fully in hardware using, for example, standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The method, system, and computer program product for implicit parcel forwarding illustrated herein can readily be implemented in hardware and/or software using any known or later developed systems or structures, devices and/or software by those of ordinary skill in the applicable art from the functional description provided herein and with a general basic knowledge of the computer, network communication, and optical recognition arts.

Moreover, the disclosed method, system, and computer program product for parcel forwarding may be readily implemented in software executed on programmed general-purpose computer, a special purpose computer, a microprocessor, or the like. In these instances, the forwarding and sorting method of this invention can be implemented as a program embedded on a personal computer such as a JAVA® or CGI script, as a resource residing on a server or graphics workstation, as a routine embedded in a dedicated encoding/decoding system, or the like. The method and system can also be implemented by physically incorporating the method for implicit parcel forwarding into a software and/or hardware system, such as the hardware and software systems of parcel sorting equipment.

It is, therefore, apparent that there is provided in accordance with the present invention, a method, system, and computer program product for parcel forwarding. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method for parcel sorting and delivery, the method comprising:

reading by a mailing computer, during a first sortation pass, all machine readable indicia and at least a portion of delivery address information on a parcel, the machine readable indicia having been applied to the parcel prior to mailing, the reading including capturing image data representing the machine readable indicia and the portion of the delivery address information;

determining by a mailing computer if any combination of the machine readable indicia applied to the parcel and contained in the image data is unique in a first database and selecting a unique machine readable indicia combination, if present, and interpreting the image data corresponding to the unique machine readable indicia combination to generate a reference indicia, the reference indicia including identified data representing a combination of discrete machine readable indicia, and if not combination of machine readable indicia is unique in the first database, then selecting a non-unique combination of machine readable indicia and interpreting the image data corresponding to the non-unique combination of machine readable indicia to generate the reference indicia;

creating an entry by a mailing computer, corresponding to the reference indicia, in the first database, the entry including a portion of the delivery address information for the parcel and a value corresponding to the reference indicia;

determine by a mailing computer whether the delivery address information has a corresponding forwarding order by accessing a pre-existing second database, different from the first database, and, when a corresponding forwarding order exists, modifying the portion of the delivery address information stored in the entry of the first database, the modification being made in accordance with the forwarding order;

forwarding by a mailing computer the entry to a third database, different from the first and second database, the third database associated with a destination sorting facility different from a sorting facility associated with the first database;

reading by a mailing computer the machine readable indicia from the parcel during a second sortation pass, subsequent to the first, identifying the reference indicia and retrieving an entry corresponding to the reference indicia from the third database;

storing by a mailing computer the parcel according to delivery address information contained in the entry retrieved from the third database; and delivering the parcel to a location corresponding to the delivery address information retrieved from the third database, wherein the delivering takes place without applying a forwarding address to the parcel when a forwarding order corresponding to the delivery address information on the parcel is in effect.

2. The method of claim 1, wherein the step of sorting the parcel includes automatically sorting the parcel to a carrier route corresponding to the delivery address information retrieved from the third database.

3. The method of claim 1, wherein the second database is a change of address database.

4. The method of claim 1, wherein the machine readable indicium selected as the reference indicia was applied for a purpose other than identifying the mailpiece.

5. The method of claim 1, wherein the step of delivering the parcel to a location corresponding to the delivery address information retrieved from the third database includes:

using a handheld device to read the machine readable indicia on the parcel;

retrieving delivery address information; and displaying the delivery address information on a display coupled to the handheld device.

6. The method of claim 5, wherein the step of retrieving delivery address information includes retrieving a parcel information record stored locally in the handheld device.

7. The method of claim 5, wherein the step of retrieving delivery address information includes retrieving a parcel information record stored remotely in a database external to the handheld device.

8. A computer system for sorting parcels, the computer system comprising:

a processor, and a memory including software instructions that, when executed, cause the computer system to perform the steps of:

reading, during a first sortation pass, at least one machine readable indicia and delivery address information on a parcel, the at least one machine readable indicia having been applied to the parcel prior to mailing;

selecting a reference indicium from the at least one machine readable indicia;

creating an entry, corresponding to the reference indicium, in a first database, the entry including a portion of the delivery address information for the parcel and a value corresponding to the reference indicium;

determining whether the delivery address information has a corresponding forwarding order by accessing a pre-existing second database, different from the first database, and, when a corresponding forwarding order exists, modifying the delivery address information contained in the entry in accordance with the forwarding order;

reading the at least one machine readable indicia during a second sortation pass, subsequent to the first, identifying the reference indicium and retrieving the entry corresponding to the reference indicium from a third database, the entry including forwarding address information;

sorting the parcel according to the forwarding address information in the entry retrieved from the third database for delivery to a location corresponding to the forwarding address information retrieved from the third database, without printing forwarding address information on the parcel.

9. The computer system of claim 8, wherein the step of sorting the parcel includes automatically sorting the parcel to a carrier route corresponding to the delivery address information modified in accordance with the forwarding order.

10. The computer system of claim 8, wherein the second database is a change of address database.

11. The computer system of claim 8, wherein selecting the reference indicia includes selecting a machine readable indicium that is not unique in the database.

12. The computer system of claim 8, wherein the step of delivering the parcel to a location corresponding to the delivery address information retrieved from the second database includes:

using a handheld device to read the machine readable indicia on the parcel;

retrieving delivery address information; and displaying the delivery address information on a display coupled to the handheld device.

13. The computer system of claim 12, wherein the step of retrieving delivery address information includes retrieving a parcel information record stored locally in the handheld device, and the step of delivering takes place without printing a unique mailpiece identification on the parcel.

14. The computer system of claim 12, wherein the step of retrieving delivery address information includes retrieving a parcel information record stored remotely in an external database, the external database disposed external to the handheld device.

15. A computer program product for sorting parcels, the computer program product comprising:

software instructions for enabling a computer to perform predetermined operations; and a non-transitory computer readable medium bearing the software instructions;

the predetermined operations including the steps of:

reading, during a first storage pass, machine readable indicia and delivery address information on a parcel, the machine readable indicia having been applied to the parcel prior to mailing for another purpose, the machine readable indicia including a non-unique machine readable indicium;

selecting a reference indicium from the machine readable indicia;

creating an entry, corresponding to the reference indicia, in a first database, the entry including a portion of the delivery address information for the parcel and a value corresponding to the reference indicium;

determining whether the delivery address information has a corresponding forwarding order by accessing a pre-existing second database, different from the first database, and, when a corresponding forwarding order exists, modifying the delivery address information contained in the entry in accordance with the forwarding order;

reading the machine readable indicia during a second sortation pass, subsequent to the first, identifying the reference indicium and retrieving an entry corresponding to the reference indicium from a third database, different from the first and second database; and sorting the parcel according to the portion of the delivery address information in the entry retrieved from the third database, without printing the retrieved information on the parcel.

16. The computer program product of claim 15, wherein the predetermined operations further include the step of delivering the parcel to a location corresponding to the delivery address information retrieved from the third database.

17. The computer program product of claim 15, wherein the step of sorting the parcel includes automatically sorting the parcel to a carrier route corresponding to the delivery address information.

18. The computer program product of claim 15, wherein the second database is a change of address database.

19. The computer program product of claim 16, wherein the step of delivering the parcel to a location corresponding to the delivery address information retrieved from the third database includes:

using a handheld device to read the machine readable indicia on the parcel;

retrieving delivery address information; and displaying the delivery address information on a display coupled to the handheld device.

20. The computer program product of claim 19, wherein the step of retrieving delivery address information includes retrieving a parcel information record stored remotely in an external database, the external database disposed external to the handheld device.

21. The method of claim 1, wherein the reading, during the first sortation pass, includes using an automatic address recognition system to image the parcel and to read all machine readable indicia and at least a portion of the delivery address information on the parcel.

* * * * *